US008805157B2

(12) United States Patent
Yoshida

(10) Patent No.: US 8,805,157 B2

(45) Date of Patent: Aug. 12, 2014

(54) IMAGE REPRODUCTION CONTROLLING DEVICE, IMAGE REPRODUCTION CONTROLLING METHOD, AND IMAGE REPRODUCTION CONTROLLING PROGRAM

(75) Inventor: Kenji Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1220 days.

(21) Appl. No.: 12/703,702

(22) Filed: Feb. 10, 2010

(65) Prior Publication Data

US 2010/0202758 A1 Aug. 12, 2010

(30) Foreign Application Priority Data

Feb. 12, 2009 (JP) ................................ 2009-029846

(51) Int. Cl.
*H04N 5/931* (2006.01)
*H04N 5/932* (2006.01)

(52) U.S. Cl.
USPC .......................................... 386/218; 386/219

(58) Field of Classification Search
USPC ................................. 386/218, 219, 230, 307
See application file for complete search history.

(56) References Cited

U.S. PATENT DOCUMENTS

| | | | | |
|---|---|---|---|---|
| 6,476,590 | B2 | 11/2002 | Chou | |
| 2006/0197732 | A1* | 9/2006 | Oyaizu et al. | 345/99 |
| 2007/0008348 | A1* | 1/2007 | Nishi et al. | 345/698 |
| 2008/0165106 | A1* | 7/2008 | Park et al. | 345/89 |
| 2009/0309903 | A1* | 12/2009 | Park et al. | 345/690 |

FOREIGN PATENT DOCUMENTS

| | | | |
|---|---|---|---|
| CN | 101034532 | A | 9/2007 |
| JP | 2002-175063 | A | 6/2002 |
| JP | 2003-005723 | A | 1/2003 |
| JP | 2003-315765 | A | 11/2003 |
| JP | 2004-233949 | A | 8/2004 |
| JP | 2007-108287 | A | 4/2007 |

* cited by examiner

*Primary Examiner* — Thai Tran
*Assistant Examiner* — Nigar Chowdhury
(74) *Attorney, Agent, or Firm* — Kilpatrick Townsend & Stockton LLP

(57) ABSTRACT

An image reproduction controlling device generates an image signal corresponding to an image file and supplies the image signal to a liquid crystal display device displaying a video and an image other than the video to reproduce the image file. The image reproduction controlling device includes: an image switch determining unit which determines whether the image file is switched from a first image file for the video to a second image file for the image other than the video or the image file is switched from the second image file to the first image file, when the image file being displayed is switched.

7 Claims, 5 Drawing Sheets

IMAGE REPRODUCTION CONTROLLING DEVICE, IMAGE REPRODUCTION CONTROLLING METHOD, AND IMAGE REPRODUCTION CONTROLLING PROGRAM

This application claims priority to Japanese Patent Application No. 2009-029846, filed Feb. 12, 2009, the entirety of which is incorporated by reference herein.

BACKGROUND

1. Technical Field

The present invention relates to an image reproduction controlling device, an image reproduction controlling method, and an image reproduction controlling program capable of reproducing an image file which at least contains information on an image.

2. Related Art

In general, a liquid crystal display apparatus including a flat panel liquid crystal display (LCD) is known as a display apparatus which displays an image on an electronic apparatus such as a personal computer or a cellular phone. In such a liquid crystal display apparatus, by supplying an image signal having a predetermined frequency (for example, 60 Hz (Hertz)) from an image reproduction display device to a liquid crystal display, an image is displayed in accordance with the image signal (see JP-A-2003-315765, JP-A-2002-175063, and JP-A-2004-233949).

However, after a still image (also referred to as a "first image"), which is an example of an image other than a video, is displayed, another image (also referred to as a "second image") different from the first image is sometimes displayed on the liquid crystal display. At this time, when the first image is displayed for a long time (for example, "30 minutes"), the first image may overlap with the second image, and thus remains as an afterimage (referred to as "image sticking") on the liquid crystal display on which the second image is being displayed. This afterimage occurs since the charges stored in the liquid crystal display during displaying the first image cannot all be discharged when the first image is switched to the second image. As a method of inhibiting this afterimage from occurring, there is known as a method of setting a frame frequency to a high frequency.

When the frame frequency of an image signal supplied to the liquid crystal display is set to the higher frequency, the charges are discharged numerous times from the liquid crystal display on which the first image is displayed, compared to a case where the frame frequency is a lower frequency. Therefore, in order to switch an image displayed on the liquid crystal display from the first image to the second image, the charges stored during displaying the first image are almost discharged, and then the image signal for the second image is supplied. As a consequence, the first image is inhibited from remaining as the afterimage on the liquid crystal display on which the second image is displayed. That is, it is difficult for a user to view the afterimage occurring due to the first image on the liquid crystal display.

However, when a compressed video file (image file) stored in a storage device such as a memory card is reproduced, a decode processor (for example, a DSP (Digital Signal Processor) in an image reproduction controlling device executes a decode process by reading the compressed video file from the storage device. Image data subjected to the decode process are transmitted from the decode processor to an internal RAM of the image reproduction control device via a bus. Thereafter, the image data temporarily stored in the RAM are sequentially read in each period corresponding to a frame frequency and are output to the liquid crystal display. As a consequence, a video of the compressed video file is displayed on the liquid crystal display.

However, when the frame frequency becomes a high frequency, a throughput processed in the decode processor is increased and the amount of image data transmitted via the bus is also increased. As a consequence, the decode process may be delayed or a process of reading the image data from the RAM may be delayed. For this reason, a problem may arise in that a noise occurs in the liquid crystal display, on which the video is displayed, since the frame frequency becomes the high frequency and thus the throughput in the image reproduction control device is increased.

SUMMARY

An advantage of some aspects of the invention is that it provides an image reproduction controlling device, an image reproduction controlling method, and an image reproduction controlling program capable of inhibiting an image from remaining as an afterimage and inhibiting a noise from entering into an image being displayed, when the image being displayed on a liquid crystal display is switched.

According to an aspect of the invention, there is provided an image reproduction controlling device which generates an image signal corresponding to an image file and supplies the image signal to a liquid crystal display device displaying a video and an image other than the video to reproduce the image file. The image reproduction controlling device includes: an image switch determining unit which determines whether the image file is switched from a first image file for the video to a second image file for the image other than the video or the image file is switched from the second image file to the first image file, when the image file being displayed is switched; a switching-time frequency changing unit which changes a frame frequency of the image signal corresponding to the image file after the switching to a frequency different from a frame frequency of the image signal corresponding to the image file before the switching, when the image switch determining unit determines that the image file is switched from the first image file to the second image file or the image file is switched from the second image file to the first image file; and an image signal supplying unit which supplies the image signal corresponding to the image file after the switching to the liquid crystal display device, after the switching-time frequency changing unit changes the frame frequency.

With such a configuration, the frame frequency of the image signal supplied from the image reproduction controlling device to the liquid crystal display device is changed, when the image being displayed on the liquid crystal display device is completely switched from the video to the image other than the video or the image is completely switched from the image other than the video to the image. That is, the image signal corresponding to the first image file for the video has the frame frequency suitable to display the video on the liquid crystal display device. Moreover, the image signal corresponding to the second image file for the image other than the video has the frame frequency suitable to display the image other than the video on the liquid crystal display device. Therefore, when the image displayed on the liquid crystal display device is switched, the image before the switching is inhibited from remaining as an afterimage. The internal throughput of the image reproduction controlling device involved in the display on the liquid crystal display device is the throughput generated by the frame frequency. Therefore, by setting the frame frequency corresponding to a kind of the image file (that is, the first image file or the second image file), the internal throughput of the image reproduction controlling device involved in the display on the liquid crystal display device is determined so as to be suitable for the kind of image displayed on the liquid crystal display device. Accordingly, a noise is inhibited from entering into the image displayed on the liquid crystal display device. As a consequence, upon switching the image displayed on the liquid crystal display device, the image before the switching is inhibited from remaining as an afterimage. Moreover, a noise is inhibited form entering into the image being displayed.

In the image reproduction controlling device according to the aspect of the invention, the image signal supplying unit may stop supplying the image signal corresponding to the image file before the switching to stop displaying the image on the liquid crystal display device and may supply the image signal corresponding to the image file after the switching to the liquid crystal display device, when it is determined that the image file is switched from the first image file to the second image file or the image file is switched from the second image file to the first image file.

With such a configuration, the supply of the image signal to the liquid crystal display device is temporarily stopped and the image is temporarily cleared on the liquid crystal display device, when the image displayed on the liquid crystal display device is completely switched from the video to the image other than the video or the image is completely switched from the image other than the video to the image. Thereafter, the image signal required to display the image after the switching is supplied to the liquid crystal display device. As a consequence, when the image is switched upon changing the frame frequency of the image signal supplied to the liquid crystal display device, a mixed image giving a discomfort to a user is inhibited from being temporarily displayed.

The image reproduction controlling device according to the aspect of the invention may further include a contrast acquiring unit which acquires the magnitude of a contrast of an image based on the second image file; and a contrast correspondent frequency setting unit which sets the frame frequency of the image signal corresponding to the second image file to a higher frequency as the contrast acquired by the contrast acquiring unit is larger, when the image signal corresponding to the second image file is supplied to the liquid crystal display device.

In general, when the image with a high contrast is displayed for a long time and then the image displayed on the liquid crystal display device is switched, the image before the switching has a tendency to easily remain as an afterimage. According to the aspect of the invention, the frame frequency of the image signal corresponding to the second image file is set to the frequency corresponding to the magnitude of the contrast of the image based on the second image file. Therefore, when the image other than the video with a high contrast is displayed and then another image is displayed, the image before the switching is effectively inhibited from remaining as an afterimage. Moreover, when an image with a relatively low contract is displayed on the liquid crystal display, the internal throughput of the image reproduction controlling device involved in the display on the liquid crystal display device is inhibited from being increased.

The image reproduction controlling device according to the aspect of the invention may further include a video frequency setting unit which sets the frame frequency of the image signal corresponding to the first image file to a higher frequency in a case where the first image file is a non-compressed file than in a case where the first image file is a compressed file.

In general, when the first image file is a compressed file, it is necessary to decode the first image file. On the contrary, when the first image file is a non-compressed file, it is not necessary to decode the first image file. In the image reproduction controlling device, the internal throughput generated upon executing the non-compressed file is smaller than that generated upon executing the compressed file. According to the aspect of the invention, the frame frequency of the image signal used to reproduce the non-compressed file is set to be higher than the frame frequency of the image signal used to reproduce the compressed file. For this reason, since the amount of internal throughput of the image reproduction controlling device to be processed is not large in reproducing the image file of the non-compressed file even in the case of the high frame frequency, a noise is inhibited from entering into the image displayed on the liquid crystal display device. In order to reproduce the compressed file, the image signal is supplied to the liquid crystal display device in a state where an internal process of the liquid crystal display device is sure to be executed. This is because the frame frequency is set to be a lower frequency. Accordingly, when the video is displayed on the liquid crystal display device, a noise is inhibited from entering into the image displayed on the liquid crystal display device.

The image reproduction controlling device according to the aspect of the invention may further include a bit rate correspondent frequency setting unit which sets the frame frequency of the image signal corresponding to the first image file to a lower frequency as a bit rate of the first image file is higher.

In general, as the bit rate of the image file is higher, the internal throughput of the image reproduction controlling device is increased. According to the aspect of the invention, the frame frequency of the image signal is set as the lower frequency as the bit rate of the first image file is higher, when the first image file is reproduced. Accordingly, even when the bit rate of the first image file is high, the image signal is supplied to the liquid crystal display device in the state where the internal process of the image reproduction controlling device is sure to be executed. Accordingly, when the video is displayed on the liquid crystal display device, a noise is inhibited from entering into the image displayed on the liquid crystal display device.

In the image reproduction controlling device according to the aspect of the invention, the switching-time frequency changing unit may change the frame frequency of the image signal corresponding to the first image file to a frequency lower than the frame frequency of the image signal corresponding to the second image file.

With such a configuration, when the first image file having a larger amount of internal throughput processed in the image reproduction controlling device than the second image file is reproduced, the frame frequency of the image signal is set to a lower frequency, compared to a case where the second image file is reproduced. Accordingly, when the first image file is reproduced, a noise is inhibited from entering into the image displayed on the liquid crystal display device. In addition, when the second image is reproduced, the frame frequency of the image signal is set to be higher than the frame frequency used to reproduce the first image file. Accordingly, when the image (the image other than the video) based on the second image file is displayed on the liquid crystal display device for a long time and then another image is displayed, the image before the switching is inhibited from remaining as an afterimage on the liquid crystal display device.

According to another aspect of the invention, there is provided an image reproduction controlling method of generating an image signal corresponding to an image file and supplying the image signal to a liquid crystal display device displaying a video and an image other than the video to reproduce the image file. The image reproduction controlling method includes: determining whether the image file is switched from a first image file for the video to a second image file for the image other than the video or the image file is switched from the second image file to the first image file, when the image file being displayed is switched; changing a frame frequency of the image signal corresponding to the image file after the switching to a frequency different from a frame frequency of the image signal corresponding to the image file before the switching, when in the determining whether the image is switched, it is determined that the image file is switched from the first image file to the second image file or the image file is switched from the second image file to the first image file; and supplying the image signal corresponding to the image file after the switching to the liquid crystal display device, after the changing of the frame frequency is executed.

With such a configuration, the frame frequency of the image signal supplied to the liquid crystal display device is changed, when the image displayed on the liquid crystal display device is completely switched from the video to the image other than the video or the image is completely switched from the image other than the video to the image. That is, the image signal corresponding to the first image file for the video has the frame frequency suitable to display the video on the liquid crystal display device. Moreover, the image signal corresponding to the second image file for the image other than the video has the frame frequency suitable to display the image other than the video on the liquid crystal display device. Therefore, when the image displayed on the liquid crystal display device is switched, the image before the switching is inhibited from remaining as an afterimage. Since the internal throughput of a controlling device, which generates an image signal from the image file and supplies the image signal to the liquid crystal display device, is the throughput corresponding to the kind (that is, the first image file or the second image file) of the image file, a noise is inhibited from entering into the image displayed on the liquid crystal display device. As a consequence, upon switching the image displayed on the liquid crystal display device, the image before the switching is inhibited from remaining as an afterimage. Moreover, a noise is inhibited form entering into the image being displayed.

According to still another aspect of the invention, there is provided an image reproduction controlling program executed by a controller which generates an image signal corresponding to an image file and supplies the image signal to a liquid crystal display device displaying a video and an image other than the video to reproduce the image file. The image reproduction controlling program causes the controller to execute: an image switch determining step of determining whether the image file is switched from a first image file for the video to a second image file for the image other than the video or the image file is switched from the second image file to the first image file, when the image file being displayed is switched; a switching-time setting value changing step of setting a frame frequency of the image signal, when in the image switch determining step it is determined that the image file is switched from the first image file to the second image file or the image file is switched from the second image file to the first image file; and an image signal supplying step of supplying the image signal corresponding to the image file after the switching to the liquid crystal display device, after the switching-time frequency changing step is executed.

With such a configuration, the frame frequency of the image signal supplied from the controller to the liquid crystal display device is changed, when the image displayed on the liquid crystal display device is completely switched from the video to the image other than the video or the image is completely switched from the image other than the video to the image. That is, the image signal corresponding to the first image file for the video has the frame frequency suitable to display the video on the liquid crystal display device. Moreover, the image signal corresponding to the second image file for the image other than the video has the frame frequency suitable to display the image other than the video on the liquid crystal display device. Therefore, when the image displayed on the liquid crystal display device is switched, the image before the switching is inhibited from remaining as an afterimage. Since the internal throughput of the controller becomes the appropriate throughput corresponding to the kind (that is, the first image file or the second image file) of the image file, a noise is inhibited from entering into the image displayed on the liquid crystal display device. As a consequence, upon switching the image displayed on the liquid crystal display device, the image before the switching is inhibited from remaining as an afterimage. Moreover, a noise is inhibited form entering into the image being displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an embodiment of the invention will be described with reference to FIGS. 1 to 3.

Figure 1:
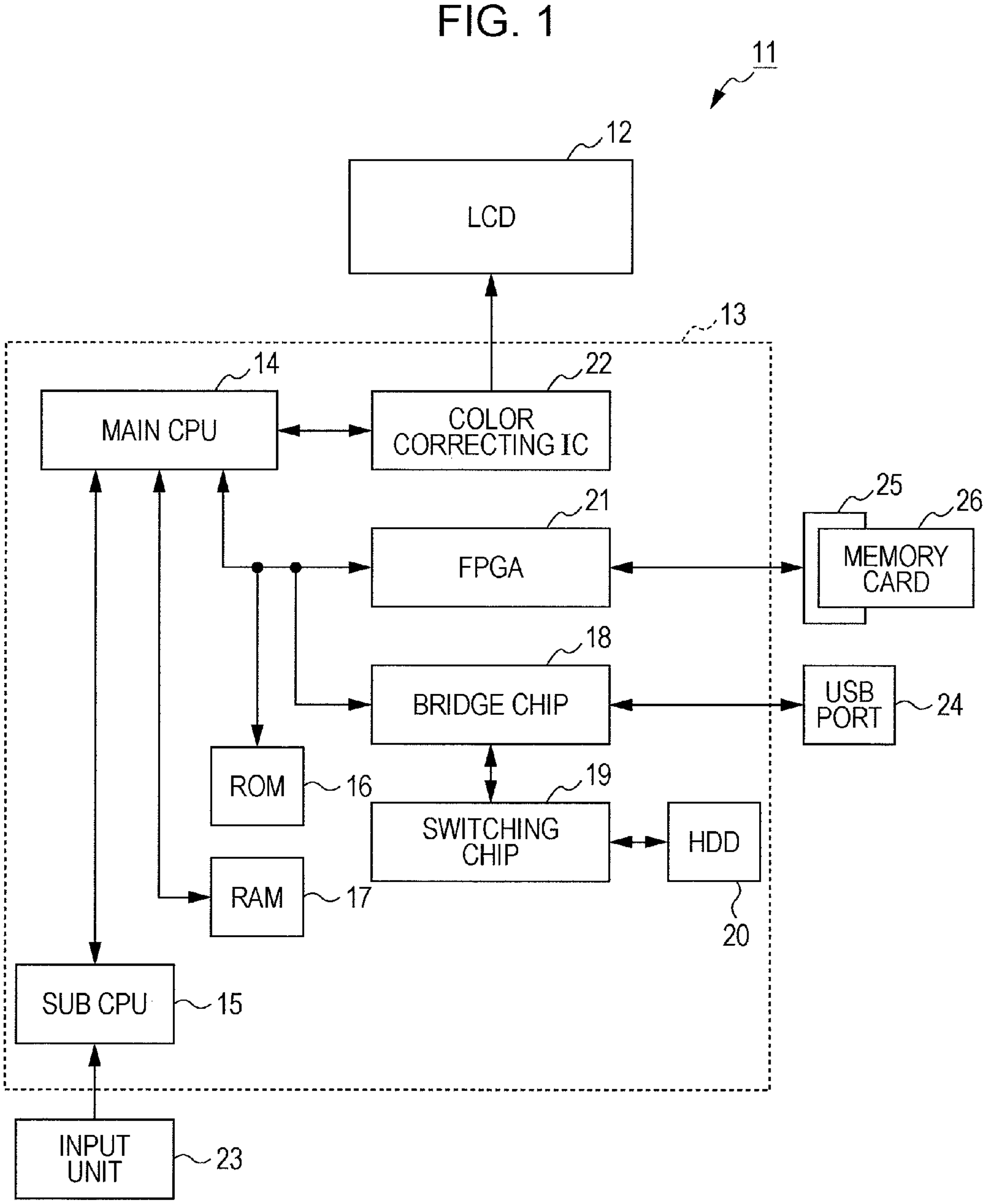
FIG. 1 is a block diagram illustrating a liquid crystal display apparatus according to a first embodiment.

As shown in FIG. 1, a liquid crystal display apparatus 11 according to this embodiment includes a liquid crystal display 12 (also referred to as an "LCD") serving as a liquid crystal display device and an image reproduction controlling device 13 controlling the display operation of the liquid crystal display 12. An image signal corresponding to an image file selected by the image reproduction control device 13 is supplied to the liquid crystal display 12. An image corresponding to the image signal is displayed on the liquid crystal display 12.

The image reproduction controlling device 13 includes a main CPU 14 serving as a controller controlling the display operation of the liquid crystal display 12 and includes a sub CPU 15, a ROM 16, and a RAM 17 electrically connected to the main CPU 14. The image reproduction controlling device 13 further includes a bridge chip 18 electrically connected to the main CPU 14, a switching chip 19 electrically connected to the bridge chip 18, and a hard disk drive (HDD) 20 electrically connected to the switching chip 19. Moreover, the image reproduction controlling device 13 includes a programmable logic device (FPGA) 21 electrically connected to the main CPU 14 and a color correcting IC (Integrated Circuit) 22 electrically connected to the main CPU 14.

The sub CPU 15 is electrically connected to an input device 23 operated by a user and executes a process corresponding to the operation of the input device 23 operated by the user. For example, when an input signal indicating the change of an image file reproduced is input from the input device 23, the sub CPU 15 outputs a signal indicating the change of the image file to the main CPU 14.

A variety of control processes (an image reproduction control process which is described below, etc.) and a variety of preset display screens (a screen displayed when power is turned on) executed by the main CPU 14 are stored in advance in the ROM 16. The control processes are appropriately read and executed by the main CPU 14. The RAM 17 temporarily stores various kinds of information (for example, image data regarding an image file being reproduced) which can be appropriately rewritten during turning on a power (not shown) of the liquid crystal display apparatus 11.

The bridge chip 18 is electrically connected to the ROM 16 and the programmable logic device 21 and also electrically connected to a USB (Universal Serial BUS) port 24. An external apparatus (for example, an electronic camera or a personal computer) (not shown) is electrically connected to the USB port 24. Therefore, when an image file stored in a storage unit (not shown) of the external apparatus is reproduced, the image file read from the external apparatus is transmitted to the main CPU 14 via the bridge chip 18. When a printing apparatus such as a printer serving as an external apparatus is connected to the USB port 24 and prints an image (in this case, a still picture) on the basis of the image file stored in the hard disk drive 20, which is described below, the image file is transmitted from the hard disk drive 20 to the external apparatus via the bridge chip 18. When various kinds of files such as an image file are copied or moved between the hard disk drive 20 and an external apparatus electrically connected to the USB port 24, the file is transmitted or received through the bridge chip 18 without involving the main CPU 14.

The switching chip 19 is a chip which switches a method of transmitting the various kinds of files such as an image file.

Image files are appropriately stored in the hard disk drive 20. The image files are classified into image files for displaying a video on the liquid crystal display 12 and image files for displaying an image other than a video on the liquid crystal display 12. In this embodiment, a kind of image file for a video are referred to as a "first image file" and a kind of image file for an image other than a video is referred to as a "second image file". Moreover, the image files classified as the first image file are further classified into compressed files in which plural image data are compressed and non-compressed files in which plural image data are not compressed. The image files classified as the second image file are constituted by at least one image data. Examples of the standard of the first image file include "MPEG4", "Motion JPEG", and "H.264".

The programmable logic device 21 is a device capable of defining or changing an internal logic circuit, if necessary, and is electrically connected to a memory card 26 inserted into a slot 25. In this embodiment, the programmable logic device 21 is configured to output information regarding whether the memory card 26 is inserted into the slot 25 to the main CPU 14. The programmable logic device 21 reads the image file from the memory card 26 and transmits the read image file to the main CPU 14, when a signal indicating the reproduction of the image file stored in the memory card 26 inserted into the slot 25 is input from the main CPU 14.

The color correcting IC 22 switches the color tone of the image signal output from the main CPU 14 and supplies the image signal after the switching to the liquid crystal display 12.

Here, a video and an image other than a video are displayed on the liquid crystal display 12 according to this embodiment. The "image other than a video" refers not only to a still image such as a photo but also an image where movement is very small on the screen. Examples of the image other than a video include an image (referred to as a "music image") displayed on the liquid crystal display 12 upon reproducing a music file, for example, an image such as a slide show sequentially displaying a plurality of still pictures, data, or the like, a screen indicating the connection with an external apparatus, a screen displayed upon copying an image file from the memory card 26 to the hard disk drive 20 (or from the hard disk drive 20 to the memory card 26), a screen displayed upon developing RAW data, and a screen displayed upon selecting an image file to be reproduced.

The music image refers to an image displaying a music name being played, a singer name, a time elapsed from the reproduction, or the like on the liquid crystal display 12. The time elapsed is updated at any time. The time elapsed is displayed as a part of the image displayed upon executing a slide show. On the screen displayed upon copying an image file from the memory card 26 to the hard disk drive 20 (or from the hard disk drive 20 to the memory card 26) and the screen displayed upon developing RAW data, a progress bar (also referred to as a "progress meter") indicating a progress status is displayed. The display of the progress bar is changed in accordance with the progress status of a process.

Next, the main CPU 14 will be described with reference to FIG. 2.

Figure 2:
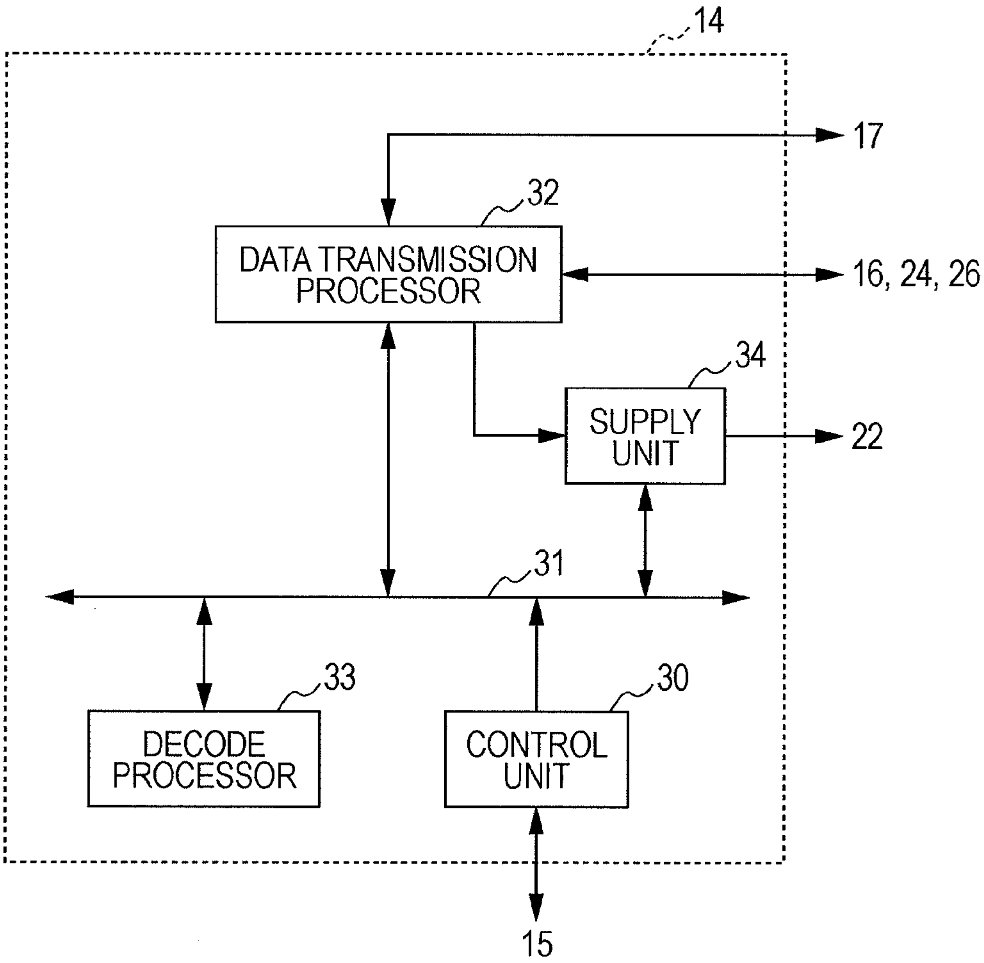
FIG. 2 is a block diagram illustrating a main CPU.
Figure 3:
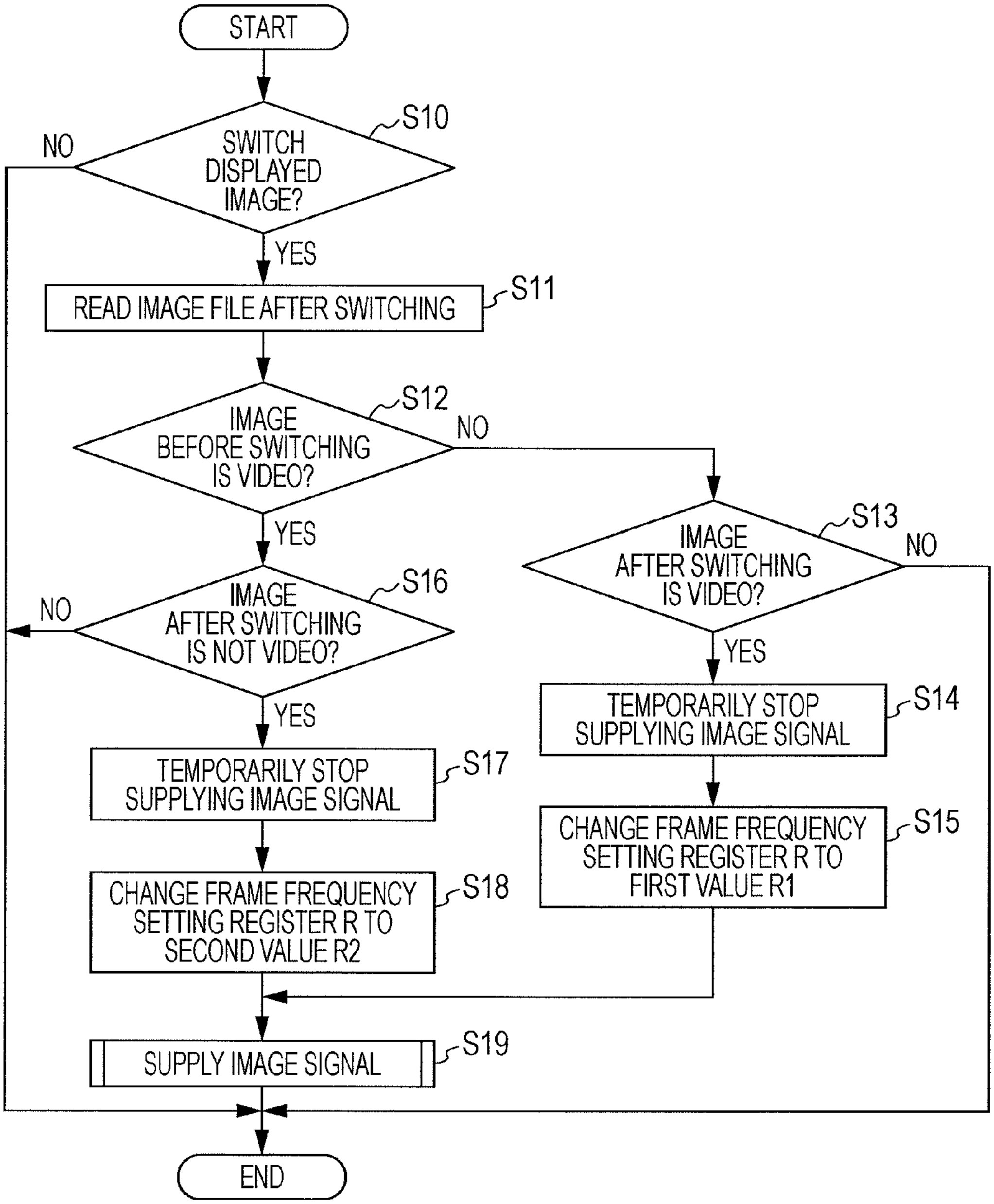
FIG. 3 is a flowchart illustrating the routine of an image reproduction controlling process according to the first embodiment.

As shown in FIG. 2, the main CPU 14, which is constituted by a microprocessor and the like, includes a control unit 30 which controls the main CPU 14 as a whole on the basis of a signal input from the sub CPU 15 and a data transmission processor 32 which is electrically connected to the control unit 30 via a bus 31. The main CPU 14 further includes: a decode processor 33 which is electrically connected to the control unit 30 and the data transmission processor 32 and is constituted by a DSP or the like specialized to process a voice or an image; and a supply unit 34 which is electrically connected to the control unit 30 via the bus 31 and into which various kinds of data or various kinds of signals are input from the transmission processor 32.

The image file of an image displayed on the liquid crystal display 12 is transmitted from the ROM 16, an external apparatus electrically connected the USB port 24, the hard disk drive 20, and the memory card 26 to data transmission processor 32. When it is not necessary to subject the transmitted image file to a decode process, which is described below, the data transmission processor 32 temporarily stores the image data forming the image file in the RAM 17. Alternatively, it is necessary to subject the transmitted image file to the decode process, which is described below, the data transmission processor 32 transmits the image file to the decode processor 33. The data transmission processor 32 temporarily store the image data in the RAM 17, when the image data subjected to the decode process in the decode processor 33 are sequentially transmitted. That is, the image data forming the image file being reproduced or being scheduled to be reproduced are stored in the RAM 17. In this state, the data transmission processor 32 reads the image data temporarily stored in the RAM 17 and transmits the read image data to the supply unit 34 at time corresponding to a frame frequency, which is described below. The data transmission processor 32 identifies an extension of the transmitted image file to determine whether the kind of the image file belongs to the second image file, the first compressed image file, or the first non-compressed image file.

The decode processor 33 executes the decode process on the image file (in this embodiment, the first image file in which plural image data are compressed) transmitted from the data transmission processor 32. That is, the image data are decompressed. The decode processor 33 sequentially transmits the image data subjected to the decode process to the data transmission processor 32. In this case, a transmission rate of the image data is increased as the frame frequency of the image signal, which is described below, is larger. That is, as the frame frequency is high, the throughput in the data transmission processor 32 and the decode processor 33 becomes larger.

The supply unit 34 sets the frame frequency corresponding to the image file being reproduced, on the basis of the value of a resistor R (see FIG. 3), which is a value set by the control unit 30. The register R is a register which is used by a clock controller (not shown) of the main CPU 14. The supply unit 34 generates transmission time of the image data by using a clock signal output by the clock controller (not shown). That is, the supply unit 34 sequentially outputs the image data transmitted from the data transmission processor 32 to the color correcting IC 22 at the time corresponding to the frame frequency. As a consequence, an image corresponding to the image signal supplied from the supply unit 34 through the color correcting IC 22 is displayed on the liquid crystal display 12. The image signal refers to a signal by which the image data are sequentially transmitted at the time corresponding to the frame frequency.

Next, among the routines of various control processes executed by the main CPU 14 (particularly, the control unit 30) according to this embodiment, the routine of the image reproduction controlling process (image reproduction controlling program) executed to reproduce the image file will be described with reference to a flowchart shown in FIG. 3.

The control unit 30 executes the routine of the image reproduction controlling process at a predetermined period (in this embodiment, 10 msec (millisecond)) set in advance. In the routine of the image reproduction controlling process, the control unit 30 determines whether an image displayed on the liquid crystal display 12 is switched (step S10). For example, when a user changes the image file being reproduced by operating the input unit 23, it is determined whether a control signal specifying the image file (also referred to as an "image file after the switching") being reproduced after the switching is input from the sub CPU 15 to the control unit 30. When the image file being reproduced is switched by ending a process (for example, a process of copying the image file from the memory card 26 to the hard disk drive 20) in the image reproduction controlling device 13, the determination is executed by determining whether the process ends.

When the determination result in step S10 is NO, the control unit 30 just terminates the routine of the image reproduction controlling process since the image file being reproduced is not switched. Alternatively, when the determination result in step S10 is YES, the control unit 30 reads the image file after the switching from the storage unit (the ROM 16, the memory card 26, the hard disk drive 20, or the like) storing the image file to the data transmission processor 32 (step S11). Subsequently, the control unit 30 determines whether the image (also referred to as an "image before the switching") being reproduced on the liquid crystal display 12 is a video (step S12). Specifically, the control unit 30 identifies the extension of the image file (also referred to as an "image file before the switching) to determine whether the kind of the image file before the switching is the first image file.

When the determination result in step S12 is NO, the control unit 30 determines whether the image after the switching is a video since the kind of image file before the switching is the second image file (step S13). That is, in steps S12 and S13, it is determined whether the kind of image file after the switching is the first image file, when the kind of image file before the switching is the second image file. Accordingly, in this embodiment, the control unit 30 functions as an image switch determining unit.

When the determination result in step S13 is YES, the control unit 30 temporarily stops supplying the image signal corresponding to the image file before the switching to clear the image based on the image file before the switching from the liquid crystal display 12 since the kind of image file being reproduced is completely switched from the second image file to the first image file (step S14). Subsequently, the control unit 30 changes the frame frequency of the image signal corresponding to the image file to a lower frequency (for example, 40 Hz (Hertz)) for the first image file (step S15). That is, the supply unit 34 has a register R for setting the frame frequency of the image signal. Therefore, when the value stored in the register R is changed, the frame frequency is changed. The control unit 30 stores a first value R1, which is a value for the first image file, in the register R. In this embodiment, the control unit 30 and the supply unit 34 serve as a switching-time frequency changing unit. The control unit 30 and the supply unit 34 execute a switching-time setting value changing step. Step S15 corresponds to the switching-time setting value changing step. Subsequently, the control unit 30 permits the process to proceed to step S19, which is described below. Alternatively, when the determination result in step S13 is NO, the control unit 30 just terminates the routine of the image reproduction controlling process without changing the frame frequency since both the kind of image file before the switching and the kind of image file after the switching are the second image file.

That is, when the kind of image file being reproduced is changed, a control signal indicating that the supply of the image signal to the liquid crystal display 12 is temporarily stopped is output from the control unit 30 to the supply unit 34. Then, the supply unit 34 stops supplying the image signal corresponding to the image file before the switching to the liquid crystal display 12 on the basis of the input of the control signal. As a consequence, the image based on the image file before the switching is cleared on the liquid crystal display 12 when the supply of the image signal to the image reproduction controlling device 13 is stopped. At this time, in the image reproduction controlling device 13, the value of the frame frequency setting register R is changed to a value corresponding to the kind of the image file after the switching.

Alternatively, when the determination result in step S12 is YES, the control unit 30 determines whether the image after the switching is not a video (that is, the image is an image other than a video) since the kind of the image file being reproduced is the first image file (step S16). That is, in steps S12 and S16, it is determined whether the kind of image file after the switching is the second image file, when the kind of image file before the switching is the first image file. Accordingly, in this embodiment, steps S12, S13, and S16 correspond to an image switch determining step.

When the determination result in step S16 is YES, the control unit 30 outputs to the supply unit 34 a control signal indicating that the supply of the image signal corresponding to the image file before the switching to the liquid crystal display 12 is temporarily stopped (step S17). Then, the supply unit 34 stops supplying the image signal corresponding to the image file before the switching to the liquid crystal display 12. Subsequently, the control unit 30 changes the frame frequency of the image signal corresponding to the image file to a higher frequency (for example, 64 Hz) for the second image file, since the kind of image file being reproduced is switched from the first image file to the second image file (step S18). In this case, the control unit 30 stores a second value R2, which is a value for the second image file, to the register R of the supply unit 34. In this embodiment, step S18 corresponds to a switching-time frequency changing step. Subsequently, the control unit 30 permits the process to proceed to step S19.

Alternatively, when the determination result in step S16 is NO, the control unit 30 just terminates the routine of the image reproduction controlling process without changing the frame frequency since both the kind of image file before the switching and the kind of the image file after the switching are the first image file.

In step S19, the control unit 30 causes the data transmission processor 32 to sequentially read the image data forming the image file after the switching from the RAM 17 and transmits the red image data to the supply unit 34. The supply unit 34 supplies the image data transmitted from the data transmission processor 32 to the color correcting IC 22 at time corresponding to the set frame frequency. That is, the image signal corresponding to the image file being reproduced is supplied to the liquid crystal display 12 through the color correcting IC 22. In this embodiment, the supply unit 34 corresponds to an image signal supplying unit. The supply unit 34 included in the main CPU 14 executes an image signal supply step. Step S19 corresponds to an image signal supplying step. Subsequently, the control unit 30 just terminates the routine of the image reproduction controlling process. Moreover, when the kind of image file before the switching is same as the kind of image file after the switching, the image signal corresponding to the image file before the switching and the image signal corresponding to the image file after the switching are supplied in succession to the liquid crystal display 12 through the color correcting IC 22.

By repeatedly executing the routine of the image reproduction controlling process, the image based on the image file selected by the user is displayed on the liquid crystal display 12. Moreover, when a video is displayed, the frame frequency of the image signal supplied to the liquid crystal display 12 is set to be lower than a frequency used to display an image other than a video. For this reason, the number of frames of a video displayed in a unit time on the liquid crystal display 12 is smaller than the number of frames of an image other than a video displayed in unit time. That is, in this embodiment, the load generated in the decode process in the decode processor 33 and the load generated when the data transmission processor 32 reads the image data from the RAM 17 are reduced, compared to a case where the frame frequency used to display a video is the same as the frame frequency used to display an image other than a video. As a consequence, since the delay of the decode process and the delay occurring upon reading the image data from the RAM 17 are solved, a noise is inhibited from entering into the liquid crystal display on which a video is displayed.

The frame frequency used to display an image (for example, a still screen) other than a video on the liquid crystal display 12 is set to be higher than the frame frequency used to display a video. Accordingly, even when an image other than a video is displayed on the liquid crystal display 12 for a long time (for example, "30 minutes") and then another image is displayed, the image before the switching is inhibited from remaining as an afterimage on the liquid crystal display 12. That is, by supplying the liquid crystal display 12 with the image signal set to have the frame frequency corresponding to the kind of image (in this embodiment, a video or an image other than a video) being displayed on the liquid crystal display 12, an image giving a discomfort to a user is inhibited from being displayed on the liquid crystal display 12.

In some cases, the format of an image file is not supported in the liquid crystal display apparatus 11 according to this embodiment. In this case, the control unit 30 causes the liquid crystal display 12 to display a message (that is, a message indicating that the image file cannot be displayed) indicating that the format of the image file selected by the user is not supported. The frame frequency of the image signal used to display such a display is set to a frequency used to display an image other than a video.

According to this embodiment, the following advantages can be obtained.

(1) when the kind of image file being reproduced is changed, the frame frequency of the image signal supplied from the image reproduction controlling device 13 to the liquid crystal display 12 is changed. That is, when the kind of image file being reproduced is switched from the second image file to the first image file, the frame frequency is set to an appropriate frequency in order to display a video on the liquid crystal display 12. When the kind of image file being reproduced is switched from the first image file to the second image file, the frame frequency is set to an appropriate frequency in order to display an image other than a video on the liquid crystal display 12. Accordingly, the image before the switching is inhibited from remaining as an afterimage, when the image displayed on the liquid crystal display 12 is switched. The internal throughput of the main CPU 14 involved in displaying an image corresponds to the throughput corresponding to the frame frequency. Accordingly, by setting the frame frequency corresponding to the kind of image file being reproduced, the internal throughput of the main CPU 14 becomes an appropriate throughput corresponding to the kind of image being displayed on the liquid crystal display 12. As a consequence, a noise is inhibited from entering into the image displayed on the liquid crystal display 12. Accordingly, when the image displayed on the liquid crystal display 12 is switched, the image before the switching is inhibited from remaining as an afterimage and a noise is also inhibited from entering into the image being displayed.

(2) When the kind of image file being reproduced is switched, the image signal corresponding to the image file before the switching and the image signal corresponding to the image file after the switching can be supplied in succession to the liquid crystal display 12. Then, a mixed image may be temporarily displayed on the liquid crystal display 12, when the frame frequency of the image signal is switched. Specifically, the image before the switching may be temporarily displayed on a part of the liquid crystal display 12 and the image after the switching may be temporarily displayed on the remaining part of the liquid crystal display 12. In this case, a problem may arise in that a user feels discomfort at this mixed image.

In this embodiment, when the kind of image file being reproduced is switched, the supply of the image signal to the liquid crystal display 12 is temporarily stopped and the image is cleared on the liquid crystal display 12 for a moment. Thereafter, an image signal required to display the image after the switching is supplied to the liquid crystal display 12. Accordingly, when the image is switched upon changing the frame frequency of the image signal supplied to the liquid crystal display 12, the mixed image giving the discomfort to the user can be inhibited from being temporarily displayed.

(3) When the kind of image file being reproduced is the first image file, the frame frequency of the image signal corresponding to the image file is set to be lower than the frequency used to reproduce the image file classified as the second image file. Accordingly, since it is possible to inhibit the delay of an internal process (the decode process or the process of reading the image data from the RAM 17) of the main CPU 14, a noise occurring due to the delay of the internal process of the main CPU 14 is inhibited from entering a video displayed on the liquid crystal display 12. Moreover, even when a video is displayed on the liquid crystal display 12 for a long time and then is switched into another image, the video before the switching rarely remains as an afterimage on the liquid crystal display 12 on which another image is displayed.

(4) The internal throughput of the main CPU 14 involved in the display on the liquid crystal display is inhibited from being increased, since the frame frequency used to reproduce a video is set to be lower than the frame frequency used to reproduce the image file classified as the second image file. Accordingly, it is possible to prevent an increase in the power consumption in the main CPU 14 upon reproducing a video. Moreover, it is possible to reduce the heat generated from the main CPU 14.

(5) When the kind of image file being reproduced is the second image file, the frame frequency of the image signal corresponding to the image file is set to be higher than the frequency used to reproduce the image file classified as the first image file. Accordingly, even when an image other than a video is displayed on the liquid crystal display 12 for a long time and then another image is displayed, an image signal is supplied which displays another image on the liquid crystal display 12 after the charges stored in capacitors of the pixels of the liquid crystal display 12 are almost discharged. Accordingly, the image before the switching can be inhibited from remaining as an afterimage on the liquid crystal display 12 on which the image after the switching is displayed. Moreover, when an image other than a video is displayed on the liquid crystal display 12, the internal throughput of the main CPU 14 is smaller than the throughput generated when a video is displayed. As for the image file for a video, a large amount of load is required to be processed in the decode process, since the image file for a video is a compressed file in many cases. As for the image file other than a video, however, a small amount of load is required to be processed in the decode process, since the image file other than a video is a non-compressed file in many cases. For this reason, even when the frame frequency is set as a higher frequency, a noise occurring due to the delay of the internal process of the main CPU 14 does not enter the image other than a video displayed on the liquid crystal display 12.

Second Embodiment

Figure 4:
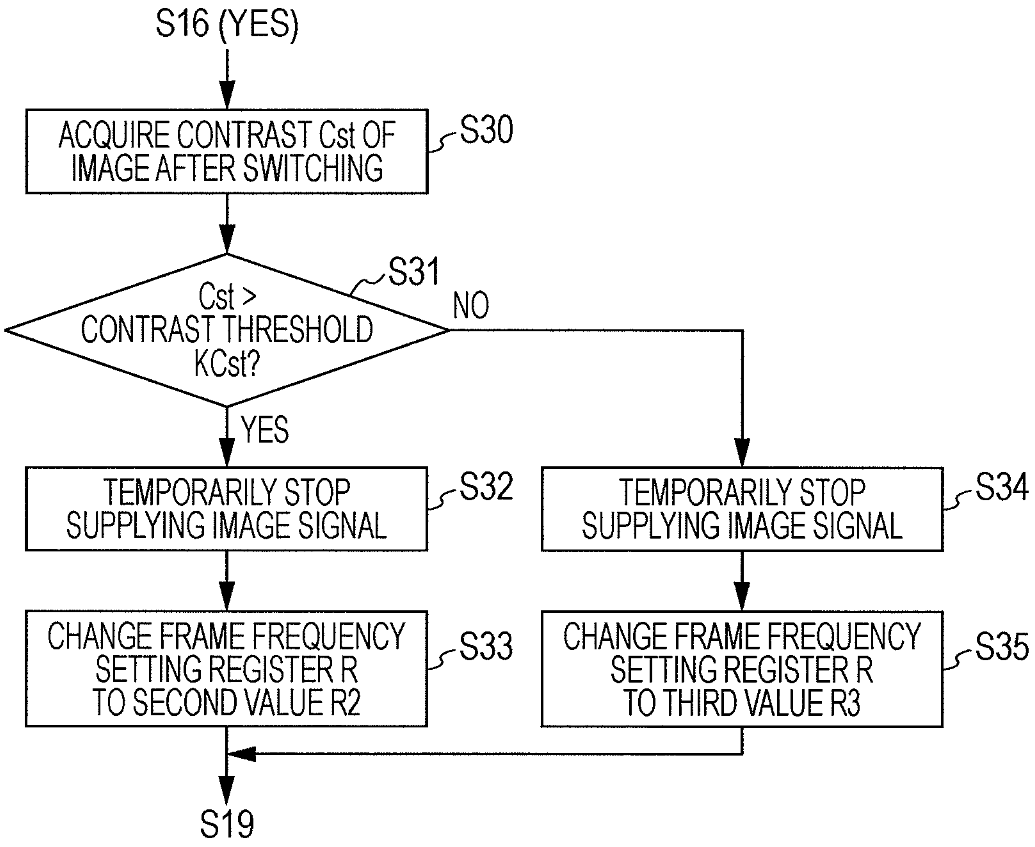
FIG. 4 is a flowchart illustrating a part of the routine of an image reproduction controlling process according to a second embodiment.

Next, a second embodiment of the invention will be described with reference to FIG. 4. In the second embodiment, some details of an image reproduction controlling process are different from those of the first embodiment. In the following description, the details different from those of the first embodiment will mainly be described. The same reference numerals are given to the same constituent elements or the corresponding members as those of the first embodiment and the repeated description is omitted.

The routine of an image reproduction controlling process executed by the main CPU 14 (particularly, the control unit 30) will be described with reference to a flowchart shown in FIG. 4. In the routine of the image reproduction controlling process according to this embodiment, when the determination result in step S16 is YES, the frame frequency used to display the image after the switching is set in accordance with the contrast of the image after the switching.

In the routine of the image reproduction controlling process according to this embodiment, when the determination result in step S16 is YES, the control unit 30 acquires a contrast Cst of the image after the switching upon reproducing the image file after the switching (step S30). Specifically, the control unit 30 calculates a difference between the brightness of the darkest region and the brightness of the brightest region in the image after the switching and acquires the contrast Cst on the basis of the calculation result. In this embodiment, the control unit 30 functions as a contrast acquiring unit. Subsequently, the control unit 30 determines whether the contrast Cst acquired in step S30 exceeds a contrast predetermined threshold KCst which is set in advance (step S31). When an image with the high contrast Cst is displayed on the liquid crystal display 12 among images other than a video, the image before the switching easily remains immediately after the image displayed on the liquid crystal display 12 is switched to another image. In this embodiment, an image with the contrast Cst exceeding the contrast threshold KCst is set with an image easily remaining as an afterimage. The contrast threshold KCst is a value which is set in advance by an experiment, a simulation, or the like.

When the determination result in step S31 is YES (Cst>KCst), the control unit 30 determines that the image after the switching is the image easily remaining an afterimage. That is, control unit 30 outputs a control signal, which indicates that the supply of the image signal corresponding to the image file before the switching to the liquid crystal display 12 is temporarily stopped, to the supply unit 34 (step S32). Then, the supply unit 34 stops supplying the image signal corresponding to the image file before the switching to the liquid crystal display 12. Subsequently, the control unit 30 sets the value of the frame frequency setting register R to a second value R2 (step S33). Therefore, the frame frequency of the image signal used to display the image after the switching on the liquid crystal display 12 is set to a frequency (for example, 64 Hz) higher than the frequency used to display an image (video) before the switching. In this embodiment, the control unit 30 also functions as a contrast correspondent frequency setting unit. Subsequently, the control unit 30 permits the process to proceed to step S19.

Alternatively, the determination result in step S31 is NO (Cst≤KCst), the control unit 30 determines that the image after the switching is not the image easily remaining as an afterimage. That is, the control unit 30 outputs a control signal, which indicates that the supply of the image signal corresponding to the image file before the switching to the liquid crystal display 12 is temporarily stopped, to the supply unit 34 (step S34). Then, the supply unit 34 stops supplying the image signal corresponding to the image file before the switching to the liquid crystal display 12. Subsequently, the control unit 30 sets the value of the frame frequency setting register R to a third value R3 different from the second value R2 (step S35). The third value R3 is set such that the frame frequency corresponding to the third value (=R3) is higher than the frame frequency corresponding to the first value R1 but is lower than the frame frequency corresponding to the second value R2. Subsequently, the control unit 30 permits the process to proceed to step S19.

In this embodiment, the following advantage can further be obtained as well as the advantages (1) to (5) of the first embodiment.

(6) In general, when an image with the high contrast Cst is displayed on the liquid crystal display 12 for a long time and another image is displayed on the liquid crystal display 12, the image before the switching has a tendency to easily remain as an afterimage. In this embodiment, when the image with the contrast Cst exceeding the contrast threshold KCst is displayed on the liquid crystal display 12, the frame frequency of the image signal is set to be higher than that in a case the contrast Cst is equal to or less than the contrast threshold KCst. Accordingly, when an image (an image other than a video) based on the image signal having this frame frequency is displayed on the liquid crystal display 12 and then is switched to an image different from the above image, the image before the switching is inhibited from remaining as an afterimage.

Moreover, even when an image (an image other than a video) with the contrast Cst equal to or less than the contrast threshold KCst is displayed for a long time, the possibility that the image before the switching remains as an afterimage upon switching the image to another image is lower than the possibility obtained when the contrast Cst of the image before the switching exceeds the contrast threshold KCst. In this embodiment, when an image (an image other than a video) with the contrast Cst equal to or less than the contrast threshold KCst is displayed, the frame frequency of the image signal is set to be lower than the frequency in the case where the contrast Cst exceeds the contrast threshold KCst. At this time, the frame frequency used to display a video on the liquid crystal display 12 becomes to a higher frequency. Therefore, even when an image (an image other than a video) with the contrast Cst equal to or less than the contrast threshold KCst is displayed for a long time and switched to another screen, the image before the switching is inhibited from remaining as an afterimage. Moreover, since the frame frequency is set to be lower than the frequency in the case where the contrast Cst exceeds the contrast threshold KCst, it is possible to reduce the internal throughput of the main CPU 14 involved in the display on the liquid crystal display. Moreover, it is possible to reduce the heat generated from the main CPU 14.

Third Embodiment

Next, a third embodiment of the invention will be described with reference to FIG. 5. In the third embodiment, some details of an image reproduction controlling process are different from those of the first and second embodiments. In the following description, the details different from those of the first and second embodiments will mainly be described. The same reference numerals are given to the same constituent elements or the corresponding members as those of the first and second embodiments and the repeated description is omitted.

The routine of an image reproduction controlling process executed by the main CPU 14 (particularly, the control unit 30) will be described with reference to a flowchart shown in FIG. 5. In the routine of the image reproduction controlling process according to this embodiment, when the determination result in step S13 is YES, the frame frequency used to display the image after the switching is set in accordance with the bit rate of the image file and whether the image file is a compressed file.

In the routine of the image reproduction controlling process according to this embodiment, when the determination result in step S13 is YES, the control unit 30 determines whether the image file after the switching is a compressed file (step S40). When the determination result is YES, the control unit 30 sequentially executes the same processes as those in steps S14 and S15 since the image file after the switching is the compressed file (steps S41 and S42). Subsequently, the control unit 30 permits the process to proceeds to step S19.

Alternatively, the determination result in step S40 is NO, the control unit 30 determines whether a bit rate BR of the image file after the switching exceeds the bit rate threshold KBR which is set in advance since the image file after the switching is a non-compressed file (step S43). As the bit rate BR of the image file after the switching is higher, the internal throughput of the main CPU 14 involved in reproducing the image file becomes larger. In other words, even in the case of a video, the internal throughput of the main CPU 14 is small when the bit rate BR of the image file is relatively low. In this embodiment, the image file with the bit rate BR exceeding the bit rate threshold KBR is referred to as a file with the high bit rate BR, and the image file with the bit rate BR equal to or less than the bit rate threshold KBR is referred to as a file with the low bit rate BR. Moreover, the bit rate threshold KBR is a value which is set in advance by an experiment, a simulation, or the like.

When the determination result in step S43 is YES (BR>KBR), the control unit 30 outputs a control signal, which indicates that the supply of the image signal corresponding to the image file before the switching to the liquid crystal display 12 is temporarily stopped, to the supply unit 34 (step S44). Then, the supply unit 34 stops supplying the image signal corresponding to the image file before the switching to the liquid crystal display 12. Subsequently, the control unit 30 sets the value of the frame frequency setting register R to a fourth value R4 different from the first value R1 since the bit rate BR of the image file after the switching is high (step S45). In this case, the frame frequency of the image signal used upon displaying the image after the switching on the liquid crystal display 12 is set to a frequency (for example, 50 Hz) higher than the frequency in the case where the image file is the compressed file, since the internal throughput of the main CPU 14 is small to the degree that it is not necessary to execute the decode process. In this embodiment, the control unit 30 also functions as a video frequency setting unit. Subsequently, the control unit 30 permits the process to proceed to step S19.

Alternatively, when the determination result in step S43 is NO (BR≤KBR), the control unit 30 outputs a control signal, which indicates that the supply of the image signal corresponding to the image file before the switching to the liquid crystal display 12 is temporarily stopped, to the supply unit 34 (step S46). Then, the supply unit 34 stops supplying the image signal corresponding to the image file before the switching to the liquid crystal display 12. Subsequently, the control unit 30 sets the value of the frame frequency setting register R to a fifth value R5 different from the first value R1 and the fourth value R4 since the bit rate BR of the image file after the switching is low (step S47). In this case, the frame frequency of the image signal used upon displaying the image after the switching on the liquid crystal display 12 is set to a frequency (for example, 55 Hz) higher than the frequency in the case where the bit rate BR of the image file is high, since the internal throughput of the main CPU 14 is small. In this embodiment, the control unit 30 also functions as a bit rate correspondent frequency setting unit. Subsequently, the control unit 30 permits the process to proceed to step S19.

In this embodiment, the following advantage can further be obtained as well as the advantages (1) to (6) of the first and second embodiments.

(7) In general, when the image file after the switching is a compressed file, it is necessary to execute the decode process on the image file being reproduced. On the contrary, when the image file after the switching is a non-compressed file, it is not necessary to execute the decode process on the image file being reproduced. That is, the internal throughput of the main CPU 14 involved in reproducing the image file of the non-compressed file is smaller than the throughput in the case where the image file of the compressed file is reproduced. In this embodiment, the frame frequency of the image signal used to reproduce the image file of the non-compressed file is set to be higher than the frame frequency of the image signal used to reproduce the image file of the compressed file. Therefore, since the internal throughput of the CPU 14 to be processed is not large in reproducing the image file of the non-compressed file even in the case of the high frame frequency, a noise occurring due to the delay of the internal process of the main CPU 14 can be inhibited from entering into the image displayed on the liquid crystal display 12. Moreover, when the image displayed on the liquid crystal display 12 can be switched to another image, the image before the switching can be inhibited from remaining as an afterimage.

Since the frame frequency is required to be set low in order to reproduce the image file of the compressed file, the image signal is supplied to the liquid crystal display 12 in the state where the internal process of the main CPU 14 is sure to be executed. Therefore, when a video is displayed on the liquid crystal display 12, the delay of the internal process of the main CPU 14 is inhibited from occurring. Accordingly, a noise can be inhibited from entering into the image on displayed the liquid crystal display 12.

(8) In general, as the bit rate BR of the image file being reproduced is high, the internal throughput of the main CPU 14 has a tendency to be increased. In this embodiment, when the image file for a video is reproduced, the frame frequency of the image signal is set to a lower frequency in the case where the bit rate BR of the image file is high. Therefore, even when the bit rate BR of the image file is high, the image signal is supplied to the liquid crystal display 12 in the state where the internal process of the main CPU 14 is sure to be executed. Accordingly, when a video is displayed on the liquid crystal display 12, a noise can be inhibited from entering into the image displayed on the liquid crystal display 12.

The above-described embodiments may be modified as follows.

In the third embodiment, even when the image file after the switching is the compressed file, the frame frequency of the image signal may be set in accordance with the bit rate BR of the image file after the switching.

In the third embodiment, the determination process in step S42 may be omitted. In this case, when the image file after the switching is the non-compressed file (that is, the determination result in step S40 is NO), it is desirable that the frame frequency of the image signal after the switching is set to be higher than the frequency in the case where the image file after the switching is the compressed file.

Figure 5:
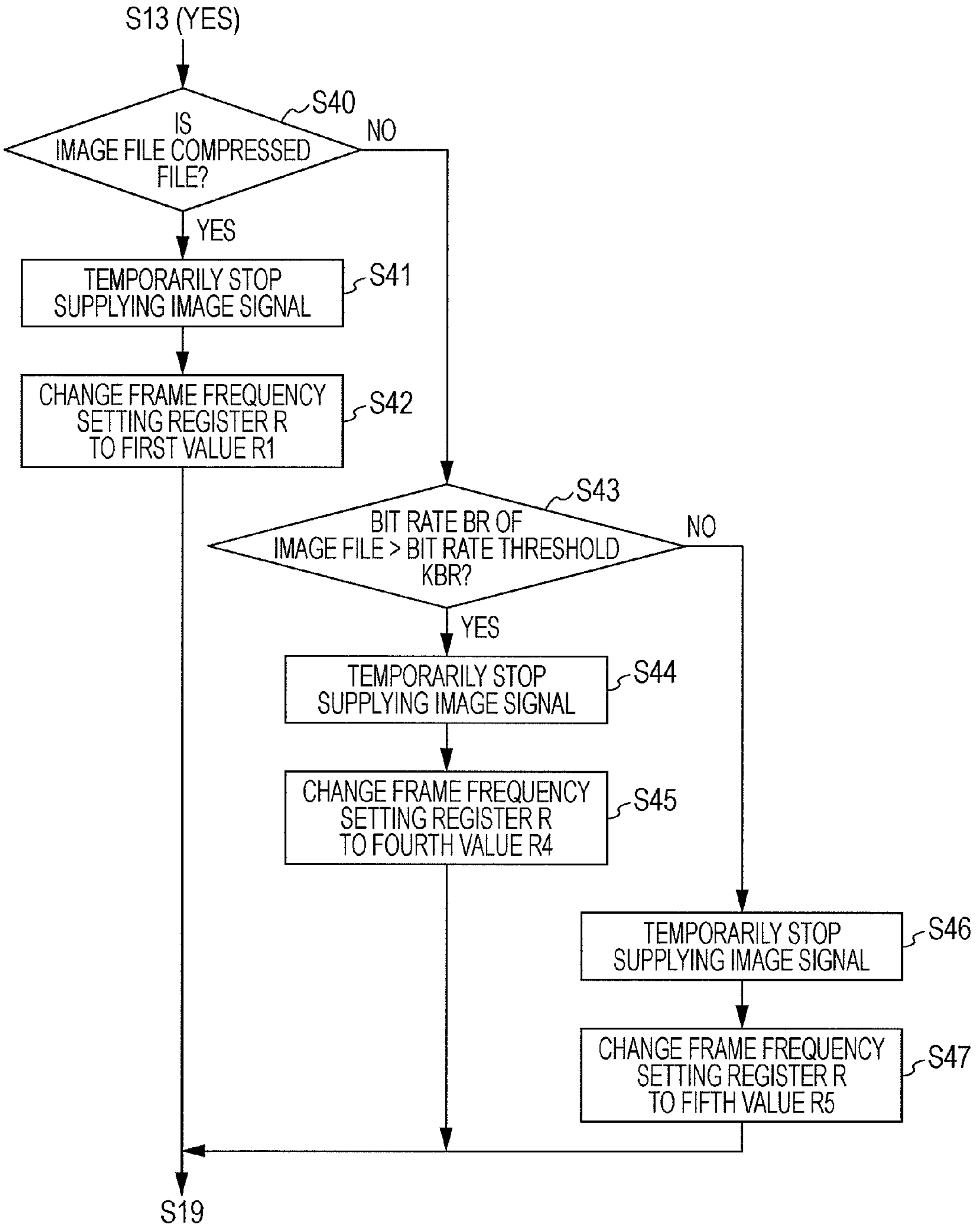
FIG. 5 is a flowchart illustrating a part of the routine of an image reproduction controlling process according to a third embodiment.

In the second embodiment, each process shown in the flowchart of FIG. 5 may be executed.

In the first embodiment, when the determination result in step S16 is NO, each process shown in the flowchart of FIG. 5 may be executed. Alternatively, when the determination result in step S13 is NO, each process shown in the flowchart of FIG. 4 may be executed.

In the above-described embodiments, when the image file being reproduced is switched, the image displayed on the liquid crystal display 12 may not be temporarily stopped. That is, the image signal (also referred to as a "first image signal") corresponding to the image file before the switching and the image signal (also referred to as a "second image signal") corresponding to the image signal corresponding to the image file after the switching may be supplied in succession to the liquid crystal display 12. In this case, it is desirable that the second image signal is supplied in the state where an image based on the first image signal is displayed on the entire screen of the liquid crystal display 12 by supplying the first image signal.

In the above-described embodiments, the image file may be a file containing information regarding music or conversation as well as the information regarding an image. When this image file is reproduced, an image corresponding to the image file is displayed on the liquid crystal display 12 of the liquid crystal display apparatus 11 and a voice corresponding to the image file is output from a speaker (not shown).

In the above-described embodiments, when the image file being reproduced is the second image file, different data may be inserted between image data used to recognize an image and image data subsequent to the image data on the liquid crystal display 12.

What is claimed is:

1. An image reproduction controlling device which generates an image signal corresponding to an image file and supplies the image signal to a liquid crystal display device displaying a video and an image other than the video to reproduce the image file, the image reproduction controlling device comprising:

an image switch determining unit which determines whether the image file is switched from a first image file for the video to a second image file for the image other than the video or the image file is switched from the second image file to the first image file, when the image file being displayed is switched;

a switching-time frequency changing unit which changes a frame frequency of the image signal corresponding to the image file after the switching to a frequency different from a frame frequency of the image signal corresponding to the image file before the switching, when the image switch determining unit determines that the image file is switched from the first image file to the second image file or the image file is switched from the second image file to the first image file;

an image signal supplying unit which supplies the image signal corresponding to the image file after the switching to the liquid crystal display device, after the switching-time frequency changing unit changes the frame frequency;

a contrast acquiring unit which acquires the magnitude of a contrast of an image based on the second image file; and a contrast correspondent frequency setting unit which sets the frame frequency of the image signal corresponding to the second image file to a higher frequency as the contrast acquired by the contrast acquiring unit is larger, when the image signal corresponding to the second image file is supplied to the liquid crystal display device.

2. The image reproduction controlling device according to claim 1, wherein the image signal supplying unit stops supplying the image signal corresponding to the image file before the switching to stop displaying the image on the liquid crystal display device and supplies the image signal corresponding to the image file after the switching to the liquid crystal display device, when it is determined that the image file is switched from the first image file to the second image file or the image file is switched from the second image file to the first image file.

3. The image reproduction controlling device according to claim 1, further comprising a video frequency setting unit which sets the frame frequency of the image signal corresponding to the first image file to a higher frequency in a case where the first image file is a non-compressed file than in a case where the first image file is a compressed file.

4. The image reproduction controlling device according to claim 1, further comprising a bit rate correspondent frequency setting unit which sets the frame frequency of the image signal corresponding to the first image file to a lower frequency as a bit rate of the first image file is higher.

5. The image reproduction controlling device according to claim 1, wherein the switching-time frequency changing unit changes the frame frequency of the image signal corresponding to the first image file to a frequency lower than the frame frequency of the image signal corresponding to the second image file.

6. An image reproduction controlling method of generating an image signal corresponding to an image file and supplying the image signal to a liquid crystal display device displaying a video and an image other than the video to reproduce the image file, the image reproduction controlling method comprising:

determining whether the image file is switched from a first image file for the video to a second image file for the image other than the video or the image file is switched from the second image file to the first image file, when the image file being displayed is switched;

changing a frame frequency of the image signal corresponding to the image file after the switching to a frequency different from a frame frequency of the image signal corresponding to the image file before the switching, when in the determining whether the image is switched, it is determined that the image file is switched from the first image file to the second image file or the image file is switched from the second image file to the first image file;

supplying the image signal corresponding to the image file after the switching to the liquid crystal display device, after the changing of the frame frequency is executed; and acquiring the magnitude of a contrast of an image based on the second image file, using a contrast acquiring unit; and setting the frame frequency of the image signal corresponding to the second image file to a higher frequency as the contrast acquired by the contrast acquiring unit is larger, when the image signal corresponding to the second image file is supplied to the liquid crystal display device, using a contrast correspondent frequency setting unit.

7. A non-transitory recording medium, having an image reproduction controlling program executed by a controller which generates an image signal corresponding to an image file and supplies the image signal to a liquid crystal display device displaying a video and an image other than the video to reproduce the image file, the image reproduction controlling program causing the controller to execute:

an image switch determining step of determining whether the image file is switched from a first image file for the video to a second image file for the image other than the video or the image file is switched from the second image file to the first image file, when the image file being displayed is switched;

a switching-time setting value changing step of setting a frame frequency of the image signal, when in the image switch determining step it is determined that the image file is switched from the first image file to the second image file or the image file is switched from the second image file to the first image file;

an image signal supplying step of supplying the image signal corresponding to the image file after the switching to the liquid crystal display device, after the switching-time frequency changing step is executed; and a contrast acquiring step acquiring the magnitude of a contrast of an image based on the second image file; and a contrast correspondent frequency setting step setting the frame frequency of the image signal corresponding to the second image file to a higher frequency as the contrast acquired by the contrast acquiring unit is larger, when the image signal corresponding to the second image file is supplied to the liquid crystal display device.

* * * * *